Nov. 19, 1963
G. S. GRESHAM
3,111,205
EXTRUDED SNAP LOCK JOINT COVER FOR INTERLOCKING EXTRUSIONS
Filed Sept. 29, 1960
2 Sheets-Sheet 1
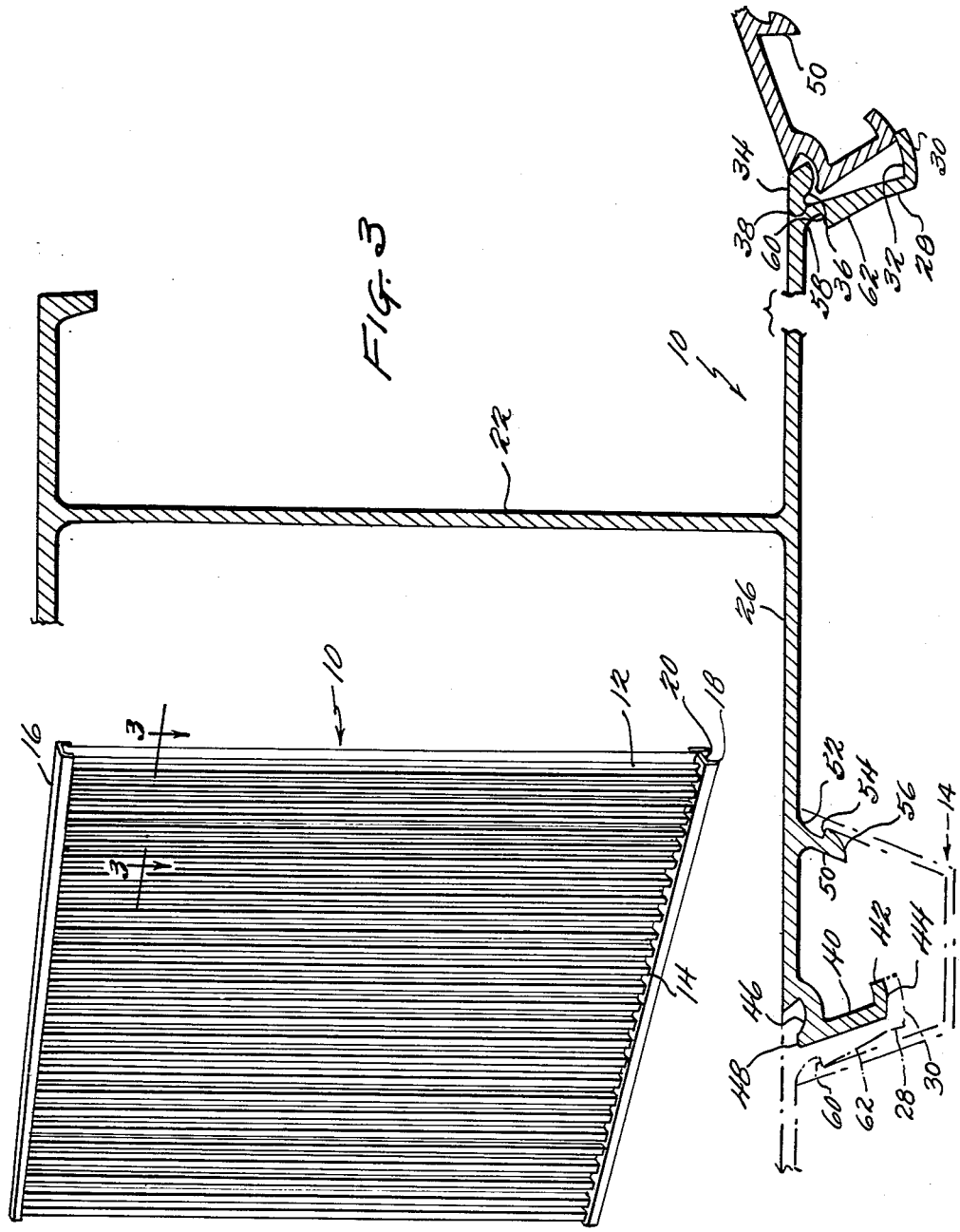
INVENTOR.
GEORGE S. GRESHMAN
BY
Glenn & Jackson
ATTORNEYS Nov. 19, 1963 G. S. GRESHAM 3,111,205
EXTRUDED SNAP LOCK JOINT COVER FOR INTERLOCKING EXTRUSIONS
Filed Sept. 29, 1960 2 Sheets-Sheet 2
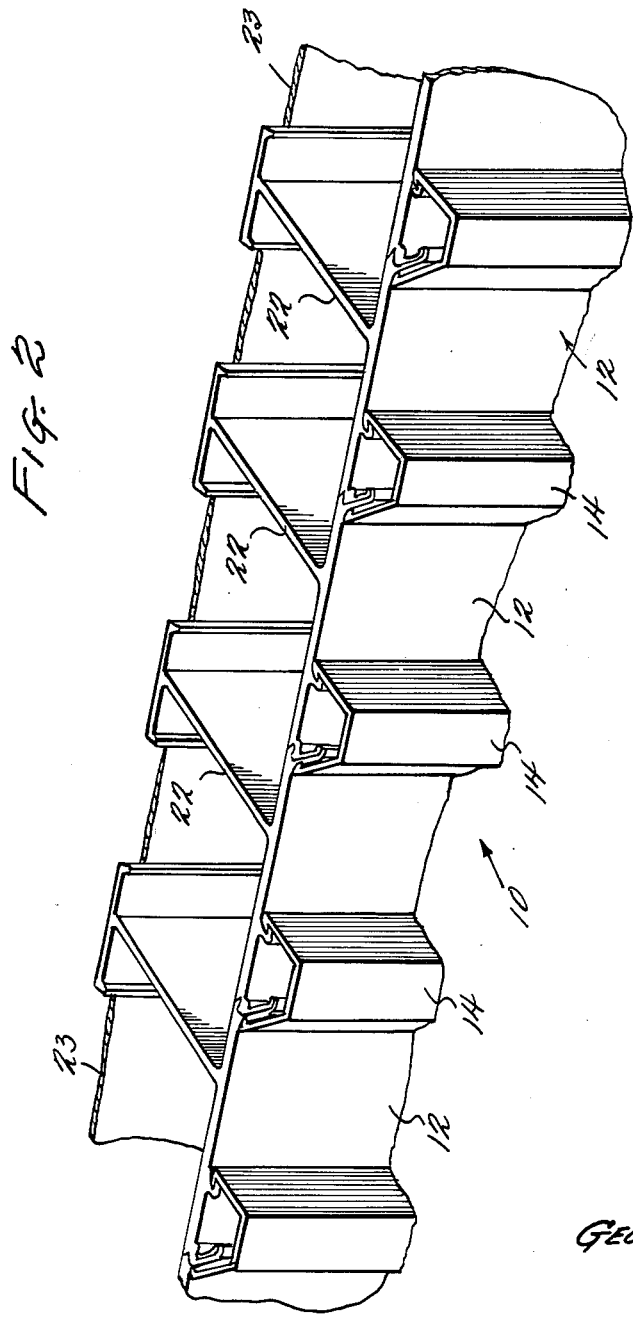
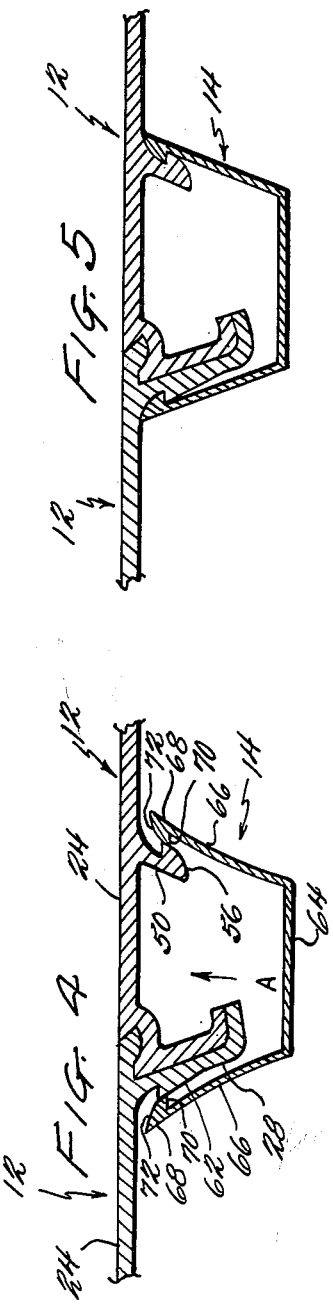
INVENTOR.
GEORGE S. GRESHAM
BY
Glenn & Jackson
ATTORNEYS

United States Patent Office 3,111,205
Patented Nov. 19, 1963

3,111,205
EXTRUDED SNAP LOCK JOINT COVER FOR INTERLOCKING EXTRUSIONS
George S. Gresham, Henrico County, Va., assignor to Reynolds Metals Company, Richmond, Va., a corporation of Delaware
Filed Sept. 29, 1960, Ser. No. 59,261
7 Claims. (Cl. 189—34)

The present invention relates to an improvement in extruded snap lock cover members for interlocking extrusions and, more particularly, to an improvement in extruded metal sections capable of being utilized in the construction of large doors, walls, or the like.

Large walls or doors of building structures such as aircraft hangers, factories, or the like must be designed to withstand wind velocities of the order of 100 miles per hour as well as loads created by snow or the like. Particularly in the construction of large hangar doors, the load factor is critical as the weight of the door is a determining factor of its feasibility in use. In the co-pending application of Ernest J. De Ridder, entitled Door Construction and Interlocking Extrusions for use thereon, serially numbered 855,886 and filed November 27, 1959, a door construction for hangars is disclosed as made from extruded panel like sections having edge profile configurations capable of being interlocked with each other to form the same. The present invention is an improvement over such prior door constructions and in particular such prior means of interlocking the extruded sections together and the forming of a stiffened joint.

It will be understood that the extruded sections for use in construction of doors in accordance with the present invention are preferably made from light weight aluminum, but it is also within the scope of the present invention to utilize other materials which may be extruded.

An object of the present invention is to provide an improved strong and rigid door construction consisting of extruded sections, preferably made of aluminum alloy or the like. The construction embodies extruded elements interlocked together with the joint strengthened by use of additional extruded sections, all sections providing for ease of assembly into a rigid structure.

Another object of the present invention is to provide an improved interlocking joint for extruded panel like sections with means providing a structure when finally assembled defining a hollow tubular configuration extending along the joint between the sections in order to lend strength to the joint and stiffness to the panel formed by the extruded sections.

Ancillary to the proceeding object, it is a further object of the present invention to provide a panel assembly made from panel like extruded sections interlocked together by relative angular rotation between each other and including means to prevent unlocking of sections when finally assembled in coplanar relationship to each other.

Still a further object of the present invention is to provide an improved joint between relatively thick panel like extruded sections, which are not conventionally snap locked, and providing means to prevent unlocking of such sections while increasing the strength of the joint between such sections.

A further object of the invention is to provide means to improve the appearance of joints between interlocked extruded panel-like sections, the means also increasing the rigidity of the joint and providing for thicker extruded panel like sections.

These and other objects and advantages of the present invention will appear more fully in the following specification, claims and drawings in which:

FIGURE 1 is an enlarged perspective view of a door construction made up of extruded aluminum sections and cover members in accordance with the present invention;

FIGURE 2 is an enlarged fragmentary perspective view of the door construction of FIGURE 1, the cap member being eliminated for the purposes of clarity;

FIGURE 3 is an enlarged sectional view taken substantially on the line 3—3 of FIGURE 1 but illustrating the position of the panel like sections during one stage of the assembling operation and further illustrating in phantom lines a completed joint;

FIGURE 4 is a fragmentary sectional view of an interlocking joint between two adjacent panel like sections but illustrating the assembling of the cover member so as to enclose the joint;

FIGURE 5 is a sectional view similar to FIGURE 4 but illustrating the completely assembled joint consisting of the interlocking panel-like extruded sections and the cover member snapped into interlocking position thereon.

Referring now to the drawings wherein like character and reference minerals represent like or similar parts and specifically to FIGURE 1, an actual embodiment of sections is illustrated forming a large door construction 10 of the order of 18 feet wide by 30 feet high. Such a door construction 10 is ordinarily used in large building structures for example aircraft hangars, factories, warehouses or the like. As will be apparent, the door construction 10 must be of sufficient strength and rigidity to withstand wind velocities of the order of 100 miles per hour and yet must be light enough in weight to be conveniently handled automatically or manually.

Referring specifically to FIGURES 1 and 2, the door construction 10 comprises a plurality of extruded panel like sections 12 assembled together in interlocking engagement, as will be described in more detail later in the specification, and a plurality of cover members 14 covering the joints of the adjacent assembled sections 12. The top of the door construction 10 is finished off by a channel shaped cap member 16 of extruded aluminum that may be welded or otherwise suitably secured to the extruded sections 12. The bottom of the door construction 10 is finished off by an inverted channel shaped member 18 of extruded aluminum having a web 20 for receiving the lower ends of the extruded sections 12. The member 18 may be suitably secured to the sections 12 by welding or the like and the extruded shape of the member 20 may be such that it can ride a track structure (not shown) in the building structure's floor.

The side ends of the door construction 10 are appropriately finished off by suitable extruded flanges (not shown) of the type disclosed in the aforementioned co-pending De Ridder application, Serial No. 855,886. As shown in FIGURE 2, at least some of the extruded sections 12 may be provided with an integral T-shaped stiffener flange 22. While the drawings illustrate each of the sections 12 being provided with an integral T-shaped flange 22, it is of course within the scope of the invention that certain of the sections need not be provided with such a flange when the door is of such a size and shape as to have sufficient strength wtih a lesser number of stiffening flanges. If desired the rear of the door construction 10 may be covered with a suitable skin 23 of thin sheet aluminum or the like. The skin 23 is welded, riveted or otherwise secured to the T-shaped flanges 22.

Referring now to FIGURE 3, the panel like extruded section 12, as viewed in sectional profile, has a main body portion 24 provided on one side thereof with a substantially uninterrupted plane surface 26. Of course, the surface 26 may or may not have a stiffening rib 22, but it is intended that the surface 26 be uninterrupted at least in the portion adjacent its longitudinal terminal edges. The section 12 is provided, along one edge portion, with a rib 28 projecting outwardly from the side of the section opposite its planar surface to 26. The rib 28 is outwardly inclined at an angle to the body portion 24 in a direction toward the edge of the body portion.

The outermost edge of rib 28 is provided with a flange-like extension 30 extending therefrom in a direction outwardly of and spaced from the main body portion 24 past the terminal edge of the same from which the rib 28 is adjacent. The flange-like extension 30 is curved so as to provide a concavely curved surface 32 facing inwardly toward the body portion 24. Beyond the rib 28, the edge portion of the panel-like section 12 is extended to define a lip 34 provided with a convexly rounded surface 36 overhanging the outer side of rib 28. The lip 34 is provided with an undercut channel portion or groove 38. The center of curvature of the curved surface 36 of lip 34 is preferably the same as the center of the curvature of the curved surface 32 of extension 30.

The opposite edge portion of one section 12 is provided with a rib 40 projecting therefrom in the same angular direction as the rib 28. The outer edge portion of rib 40 is provided with a reversely turned flange-like extension 42 having a convexly curved outwardly facing surface 44 which is complementary to the inwardly facing curved surface 32 of extension 30. A groove or channel 46 is provided along the terminal edge portion of body 26 at the base of the rib 40 and is provided with a rounded nose portion 48. The concave curvature of the groove 46 and the rounded nose 48 are complementary to the convexly curved surface 36 and profile configuration of lip 34. Also, it will be understood that the center of curvature of the concavely curved surface 46 is preferably the same as the convexly curved surface 44.

Spaced inwardly from the rib 40 and projecting from the body portion 24 of section 12 is a rib 50 integrally projecting from the same surface of the body portion 24 in a direction opposite to the direction of rib 40. The rib 50 is provided with an undercut portion 52 defining a flat plane abutment surface 54 which faces inwardly toward the outer surface of body 24. The outer edge of rib 50 is preferably rounded or beveled as shown at 56 and extends outwardly of the undercut portion 52.

Rib 28 is provided on its surface which faces rib 40 with an undercut portion 58 which defines a flat plane abutment surface 60 facing inwardly toward the surface of body portion 24. The area of the rib 28 outwardly of the undercut portion 58 is gently sloping as shown at 62 so as to provide a camming surface, the function of which will be described in more detail later in the specification.

The sections 12 as described above may be assembled in interlocking engagement by partially engaging the complementary curved surfaces 36—46 and 32—44 as shown in FIGURE 3. When the curved surfaces 36—46 and 32—44 are partially engaged, the adjacent sections 12 have their body portions 24 disposed at an angle to each other. Upon relative rotation of one section 12 with an adjacent section 12 on the cooperating curved surfaces causes the sections to assume a position as shown in FIGURE 4 wherein the body portions 24 of adjacent sections 12 are in coplanar relationship. When adjacent sections 12 are in interlocking engagement, with their body portions 24 in coplanar relationship, the only way the sections 12 can be disengaged is by reverse rotation of the sections 12. The friction between the interlocking profile and configurations of the sections 12 is such that the sections 12 cannot be conveniently slid relatively lengthwise of each other. However, the present invention contemplates providing an additional lock for the joint between adjacent sections 12 which will not only prevent adjacent sections 12 from being unlocked, but which will also add to the strength of the joint by providing a box like structure at the joint. Further, the present invention contemplates utilizing such locking means to improve the appearance of the joint.

Referring now to FIGURES 4 and 5 there is illustrated the locking cover member 14 which is made by extrusion and is illustrated as U-shaped in cross section. The cover member 14 includes a web 64 having a pair of legs 66 extending from its longitudinal edges. Each leg 66 is provided along its free edge with a flange like ridge 68, one ridge 68 of one leg 66 extending toward the other ridge 68 of the other leg 66. The ridge 68 defines a plane abutment surface 70 complementary to the abutment surfaces 54 and 60 of the ribs 50 and 28 respectively. The outer portion of the ridge 68 is rounded or beveled as indicated at 72, the surface 72 being complementary in shape to the undercut portions 58 or 52.

Since the extruded sections 12 are made in large sizes for forming large panel like structures of doors and the like, the minimum extrusion thickness of the sections 12 is thicker than is convenient to flex and form a snap lock. Consequently, the present invention contemplates making the cover member 14 of an extrusion of considerably less cross sectional thickness than the thickness of the sections 12 so that the legs 66 of the cover member 14 can have a degree of flexibility with respect to the sections 12. This permits making the sections 12 of a required thickness to give a desired stiffness and strength to the panel assembly being constructed. Also it should be considered that by making the cover member 14 separate as opposed to being integral as shown in the aforementioned application Serial No. 855,886, the sections 12 can be made of the desired thickness. It is well known in the art of extrusion of aluminum alloys that articles may have only a certain maximum cross-sectional area. In other words, extrusions cannot be made where their area is greater than the predetermined maximum. By making the cover member 14 separate, no cross-sectional area is taken up by an integral cover member 14 and thus such material can be utilized in the section being extruded, to make the section thicker.

Referring now to FIGURE 4, two adjacent sections 12 are shown in interlocking engagement along their longitudinal edges with their body portions 24 in coplanar relationship. The cover member 14 is shown in position where its ridges 68 have been cammed outwardly by the camming surface 62 of rib 28 and ridge 56 of rib 50. Continued movement of the cover member 14 in the direction of the arrow A, FIGURE 4, will cause the ridges 68 of the legs 66 to snap over and into a position as illustrated in FIGURE 5. When in this position, the sections 12 are prevented from being reversely rotated out of interlocking engagement. Also, the joint between the sections 12 is covered by the cover member 14 so as to provide a box like construction at the joint to thereby give more rigidity and stability to the joint and the panel formed.

While the cover member 14 is shown as U-shaped in cross section, it is of course within the scope of the present invention that other convenient shapes could be given to the extrusion used for the cover member 14 so as to change the appearance of the joint as desired. For example, the cover member 14 could be arcuate in cross section or V-shaped in cross section or the like.

FIGURE 2 illustrates a fragmentary portion of a panel constructed according to the present invention. It will be noted in FIGURE 2 that the joints formed by adjacent interlocking sections 12 are covered on the side of the joint where the interlocking edge profile configurations project. The integral T-shaped stiffener members 22 extend from an opposite surface of the body portions 24 of the sections 12 and the outer surface of the cross bar of the T-shaped flanges 22 may be used to secure by spot welding or the like the skin 23 of thin aluminum so as to provide a substantially solid looking door construction.

It is thus seen that the objects and advantages of this invention have been fully and effectively accomplished by the structure illustrated in the drawings and described hereinbefore. However, the foregoing specific embodiment is subject to some changes without departing from the principals of the invention involved. For this reason, the terminology in this specification is for the purpose of description and not limitation, the scope of the invention being defined in the claims.

I claim:

1. A set comprising at least two extruded panel like sections having edge portions provided with generally complementary integral interlocking profile configurations adapted to be assembled into interlocking engagement to form at least a portion of a panel having a substantially flat and uninterrupted surface portion on one side thereof at the joint between said sections, the first of said sections having along an edge portion a rib projecting outwardly from the plane of said first section, said rib having a flange like extension extending generally in the direction of but spaced from the plane of said first section and outwardly of said edge portion, said flange like extension having an inwardly facing curved surface, a lip disposed generally in the plane of said first section and overhanging the outer side of said rib, said lip being provided with a curved surface concentric to and facing the curved surface of said extension, a second of said sections being provided along its edge portion with a groove and nose portion generally complementary to and adapted to interfitting engagement with said lip on said first section, said second section also being provided along its edge portion with a rib projecting from the other side of said second section and having a reversed flange-like extension, the outer surface of said last mentioned flange-like extension being complementary to and adapted to fit snugly against the curved surface of the extension of said first mentioned rib, the construction and arrangement of said first and second sections being such that said lip of said first section may be partially engaged with said groove on said second section with the sections inclined relative to each other and then said sections relatively rotated about such partial engagement into a position where the sections are substantially coplanar with said reversed extension riding on the curved surface of the extension of said first section, and an extruded cover member adapted to enclose the joint between said panel like extruded sections on the side of said extruded sections where the respective ribs project, said extruded cover member having free edges with flange like ridges extending longitudinally of the same and defining inwardly facing plane abutment surfaces, each of said sections having complementary plane abutment surfaces thereon whereby said cover member may be snapped on and latched to said first and second sections and thereby restrain the first and second sections against reverse pivotal unlocking movement when in interlocking engagement.

2. The structure defined in claim 1 wherein said first and second panel like sections have a sectional thickness greater than the sectional thickness of said cover member whereby said cover member may flex when being snapped onto said first and second sections.

3. The structure defined in claim 1 wherein said extruded cover member is U-shaped in cross-section.

4. The structure defined in claim 1 wherein said rib of said first section projects outwardly from the plane of said first section on an incline and wherein the rib of said second section projects outwardly from the plane of said second section on a complementary incline.

5. The structure defined in claim 4 wherein said rib of said first section is provided with an undercut portion defining said plane abutment surface, said undercut portion being on the side of said rib opposite to said flange like extension.

6. The structure defined in claim 5 wherein said rib of said first section is provided with a camming surface outwardly of said undercut portion, said camming surface being adapted to cooperate with one of the ridges on said cover member whereby said cover member is adapted to ride over the camming surface and then have its ridge snap into the undercut portion of the rib of said first section.

7. The structure defined in claim 4 wherein said second section is provided with a second rib projecting from the plane thereof and spaced inwardly from the first-mentioned rib of said second section, said second rib having an undercut portion defining said plane abutment surface of said second section which cooperates with one of the plane abutment surfaces on said cover member.

References Cited in the file of this patent

UNITED STATES PATENTS

| | | |
|---|---|---|
| 2,405,643 | Crot | Aug. 13, 1946 |
| 2,476,451 | Murphy et al. | July 19, 1949 |
| 2,680,503 | Clarke | June 8, 1954 |
| 2,786,556 | Constance | Mar. 26, 1957 |
| 3,031,043 | Dresser et al. | Apr. 24, 1962 |
| 3,043,407 | Marryatt | July 10, 1962 |
| 3,046,852 | Graham | July 31, 1962 |